United States Patent
Zhang

(10) Patent No.: US 9,692,568 B2
(45) Date of Patent: Jun. 27, 2017

(54) DEVICE, METHOD, MOBILE STATION, AND DIGITAL STORAGE MEDIUM

(71) Applicant: Hong Zhang, Xi'an (CN)

(72) Inventor: Hong Zhang, Xi'an (CN)

(73) Assignee: Intel Deutschland GmbH, Neubiberg (DE)

( * ) Notice: Subject to any disclaimer, the term of this patent is extended or adjusted under 35 U.S.C. 154(b) by 240 days.

(21) Appl. No.: 13/976,747

(22) PCT Filed: Dec. 31, 2012

(86) PCT No.: PCT/CN2012/001766
§ 371 (c)(1),
(2) Date: Jun. 27, 2013

(87) PCT Pub. No.: WO2014/100922
PCT Pub. Date: Jul. 3, 2014

(65) Prior Publication Data
US 2014/0185538 A1   Jul. 3, 2014

(51) Int. Cl.
*H04L 5/00* (2006.01)
*H04L 5/12* (2006.01)
(Continued)

(52) U.S. Cl.
CPC .............. *H04L 5/0044* (2013.01); *H04L 5/12* (2013.01); *H04L 27/2089* (2013.01); *H04B 17/327* (2015.01)

(58) Field of Classification Search
None
See application file for complete search history.

(56) References Cited

U.S. PATENT DOCUMENTS 6,847,693 B1 *   1/2005   Strait ...................... H03L 7/091
                                                                    375/326
8,705,679 B1 *   4/2014   Venkatesh et al. ........... 375/368
(Continued)

FOREIGN PATENT DOCUMENTS

WO     WO 2011095043 A1 *  8/2011

*Primary Examiner* — Chi H Pham
*Assistant Examiner* — Vladislav Agureyev
(74) *Attorney, Agent, or Firm* — Schiff Hardin LLP

(57) ABSTRACT

A device, a method, a mobile station and a non-transitory computer-readable digital storage medium are provided. The device comprises a quadrant classification unit to classify a plurality of symbols in an input shared channel signal into a plurality of quadrants in a complex plane, an energy determination unit to determine a real part energy and an imaginary part energy for the plurality of symbols in each of the plurality of quadrants respectively, an energy summing unit to determine a real part energy sum $E_I$ and an imaginary part energy sum $E_Q$ by summing the real part energy and the imaginary part energy for the plurality of quadrants respectively, and an estimation unit to estimate a SubChannel Power Imbalance Ratio (SCPIR) of the input shared channel signal the real part energy sum $E_I$ and the imaginary part energy sum $E_Q$.

16 Claims, 5 Drawing Sheets

(51) Int. Cl.
*H04L 27/20* (2006.01)
*H04B 17/327* (2015.01)

(56) References Cited

U.S. PATENT DOCUMENTS

| | | | |
|---|---|---|---|
| 2010/0040166 A1* | 2/2010 | Xin | H04L 25/0226 375/267 |
| 2010/0203854 A1* | 8/2010 | Yu | H04L 27/20 455/127.1 |
| 2010/0279701 A1* | 11/2010 | Chen | 455/452.2 |
| 2011/0268258 A1* | 11/2011 | Alloin et al. | 379/32.04 |
| 2011/0279736 A1* | 11/2011 | Tang et al. | 348/731 |
| 2011/0280349 A1* | 11/2011 | Hong | H04L 25/0216 375/344 |
| 2012/0113878 A1* | 5/2012 | Yu | H04W 52/325 370/311 |
| 2012/0207042 A1* | 8/2012 | Rodriguez | H04W 8/22 370/252 |
| 2012/0220292 A1* | 8/2012 | Yu et al. | 455/424 |
| 2012/0244817 A1* | 9/2012 | Das | H04L 5/12 455/67.11 |
| 2012/0294290 A1* | 11/2012 | Mitchell | H04L 1/203 370/336 |
| 2013/0126713 A1* | 5/2013 | Haas et al. | 250/208.2 |
| 2013/0163443 A1* | 6/2013 | Liberg | H04L 27/2089 370/252 |
| 2014/0044089 A1* | 2/2014 | Lopez et al. | 370/330 |
| 2014/0315534 A1* | 10/2014 | Soler et al. | 455/418 |

\* cited by examiner

300

Classifying a plurality of symbols in an input shared channel signal into a plurality of quadrants in a complex plane
302

Determining a real part energy and an imaginary part energy for each quadrant

Determining a real part energy sum $E_I$ and an imaginary part energy sum $E_Q$
306

Estimating a SubChannel Power Imbalance Ratio (SCPIR) of the input shared channel signal based on the real part energy sum $E_I$ and the imaginary part energy sum $E_Q$
308

FIG. 3

DEVICE, METHOD, MOBILE STATION, AND DIGITAL STORAGE MEDIUM

BACKGROUND

A Voice services over Adaptive Multiuser channels on One Slot (VAMOS) technology has been proposed to optimize spectrum utilization. The technology allows two users to share one time slot on the same frequency band simultaneously. The two users are called the paired users, and what they occupy are two subchannels, i.e. subchannel 1 and subchannel 2.

Each of the paired users will receive a signal from both of the paired users. Hence, for one of the paired users, a signal from the other paired user constitutes a co-channel or shared channel interference. To eliminate the interference, it is desirable to estimate a SubChannel Power Imbalance Ratio (SCPIR) between subchannel 1 and subchannel 2 of the shared channel.

BRIEF DESCRIPTION OF THE DRAWINGS

Aspects of the present disclosure will be understood more fully from the detailed description given below and from the accompanying drawings of various examples of the invention, which, however, should not be taken to limit the invention to the specific examples, but are for explanation and understanding only.

FIG. 3 illustrates a flow chart of an exemplary energy-based method for estimating a SubChannel Power Imbalance Ratio (SCPIR) of an input shared channel signal.

DETAILED DESCRIPTION

In the following description, numerous details are set forth to provide a more thorough explanation of examples of the present invention. It will be apparent, however, to one skilled in the art, that examples of the present invention may be practiced without these specific details. In other instances, well-known structures and devices are shown in block diagram form, rather than in detail, in order to avoid obscuring examples of the present invention.

Throughout the description and claims, the terminology "mobile station" includes, but is not limited to, a mobile station, a user equipment, a mobile subscriber unit, a mobile television client, a pager, a cellular telephone, a Personal Digital Assistant (PDA), a smart phone, a text messaging device, a network interface card, a notebook computer, or any other type of mobile device capable of operating in a wireless environment.

Figure 1:
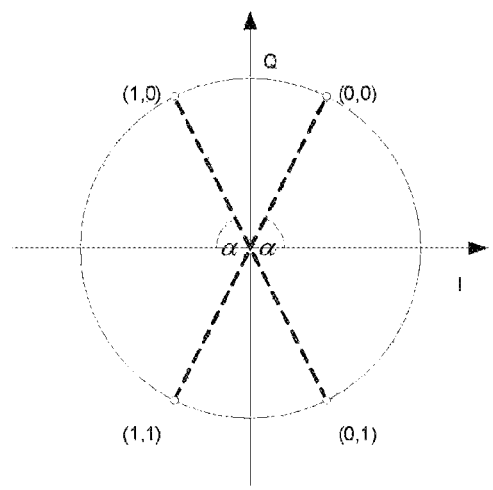
FIG. 1 illustrates an exemplary constellation of a Voice services over Adaptive Multiuser channels on One Slot (VAMOS) signal.

When multiple users share a same channel over the same time slot for services such as voice voices in a mobile communication system, two users are paired on the same physical resource. Thus, those two users utilize the same time slot and the same frequency band. FIG. 1 illustrates an exemplary constellation of a signal in such a system, such as a Voice services over Adaptive Multiuser channels on One Slot (VAMOS) system. In a complex plane shown in FIG. 1, one user is mapped to a real axis indicated by "I", and the other user is mapped to an imaginary axis indicated by "Q".

Since bits intended for the two users are transmitted together, each symbol in the signal includes two bits. Hence, there are four points in the constellation, as shown in FIG. 1. In this example, these points are represented by bit pairs (0,0), (0,1), (1,0) and (1,1). It should be noted that numbers included in the bit pairs as shown are raw bits, which are unipolar.

In a general mobile communication system, the raw bits may be converted to bipolar bits. After the conversion, raw bit 0 is mapped to 1, and raw bit 1 is mapped to −1. So the above-mentioned exemplary bit pairs are (1,1), (1,−1), (−1, 1) and (−1,−1) respectively.

With two users, the power of one user usually differs from the power of the other user since the two users may have different distances from a base station from which they receive signals, and/or may suffer from different fading. A power ratio between the two users is controlled by a power imbalance ratio between two subchannels occupied by the two users, that is a SubChannel Power Imbalance Ratio (SCPIR), which may be calculated from an angle ($a^\alpha$ shown in FIG. 1) based on the following formula:

$$\text{SCPIR} = 20 \log_{10}(\cot(\alpha)) \quad (1)$$

Therefore, the constellation of a Voice services over Adaptive Multiuser channels on One Slot (VAMOS) signal may be uniquely determined by the SubChannel Power Imbalance Ratio (SCPIR).

To guarantee receiving performance of the users, especially a user with a lower power, a joint detection is used in which transmitted bits intended for both users are decoded. How to estimate the SubChannel Power Imbalance Ratio (SCPIR) so as to recover the constellation of the Voice services over Adaptive Multiuser channels on One Slot (VAMOS) signal is a very critical problem in the joint detection.

A correlation-based method may be used to estimate the SubChannel Power Imbalance Ratio (SCPIR). In general, a transmitted Voice services over Adaptive Multiuser channels on One Slot (VAMOS) signal $S(n)$ may be expressed as:

$$S(n) = G_I TSC_I(n) + j G_Q TSC_Q(n) \quad n=0,\ldots,147 \quad (2)$$

where $TSC_I(n)$ represents a training sequence corresponding to a Training Sequence Code (TSC) of one user which is mapped to I axis shown in FIG. 1, $TSC_Q(n)$ represents a training sequence corresponding to a Training Sequence Code (TSC) of the other user which is mapped to Q axis shown in FIG. 1, $G_I$ and $G_Q$ represent a gain of I axis user and a gain of Q axis user respectively, and n represents the sequence number of symbols included in the training sequence.

$G_I$ and $G_Q$ may be calculated from the following formulas:

$$G_I = \cot(\alpha) \quad (3)$$

$$G_Q = \tan(\alpha) \quad (4)$$

Training Sequence Codes (TSCs) in TSC Set 1 are sophisticatedly selected for legacy terminals. Training Sequence Codes (TSCs) in TSC Set 2 are selected for the need of terminals such as Voice services over Adaptive Multiuser channels on One Slot (VAMOS) terminals. Each TSC Set consists of 8 Training Sequence Codes (TSCs). One of the paired users uses one Training Sequence Code (TSC) in TSC Set 1, and the other of the paired users uses one Training Sequence Code (TSC) in TSC Set 2. Please refer to 3GPP TS 45.002 for details of TSC Set 1 and TSC Set 2.

To simplify the issue without losing generality, it is assumed that $TSC_I(n)$ is a training sequence corresponding to TSC5 in TSC Set 1 and $TSC_Q(n)$ is a training sequence corresponding to TSC5 in TSC Set 2. Further, it should be noted that only a training sequence of 26 symbols, rather than a total of 148 symbols in one burst, is considered so as to simplify the issue.

Therefore, the SubChannel Power Imbalance Ratio (SCPIR) may be estimated based on the following formula:

$$SCPIR = 10\log_{10}\left(\frac{\|cor(S, TSC_I)\|^2}{\|cor(S, TSC_Q)\|^2}\right) \quad (5)$$

where $$cor(S, TSC_I) = \sum_{n=0}^{25} S(n)TSC_I(n) \quad (6)$$

$$cor(S, TSC_Q) = \sum_{n=0}^{25} S(n)TSC_Q(n) \quad (7)$$

and $\|x\|^2 = xx^*$ wherein * represents a conjugation operator.

It is assumed that only a training sequence corresponding to TSC5 in TSC Set 1 is transmitted on I axis. Theoretically, the estimated SubChannel Power Imbalance Ratio (SCPIR) should be plus infinite.

However, by substituting a training sequence corresponding to TSC5 in TSC Set 1 and a training sequence corresponding to TSC5 in TSC Set 2 into formula (5), the actual estimated SubChannel Power Imbalance Ratio (SCPIR) is only 22.3 dB. This means by using the correlation-based method, the maximum estimated SubChannel Power Imbalance Ratio (SCPIR) is 22.3 dB. The basic reason is imperfect orthogonality between the training sequence corresponding to TSC5 in TSC Set 1 and the training sequence corresponding to TSC5 in TSC Set 2. Due to the imperfect orthogonality, there is still some energy of the training sequence corresponding to TSC5 in TSC Set 2 projected to a direction of the training sequence corresponding to TSC5 in TSC Set 1, which makes the estimated SubChannel Power Imbalance Ratio (SCPIR) deviate from the real SubChannel Power Imbalance Ratio (SCPIR). The imperfect orthogonality always exists between any of all training sequences corresponding to Training Sequence Codes (TSCs) in TSC Set 1 and any of all training sequences corresponding to Training Sequence Codes (TSCs) in TSC Set 2. Hence, for any combination of training sequences from the two TSC sets, the real SubChannel Power Imbalance Ratio (SCPIR) can never be estimated, and the difference is that different combinations may have different theoretical maximum estimation.

Therefore, the correlation-based method has a ceiling effect for SubChannel Power Imbalance Ratio (SCPIR) estimation. Further, if a multipath effect is considered, the maximum estimated SubChannel Power Imbalance Ratio (SCPIR) may be much smaller.

To overcome the ceiling effect of the correlation-based method, an energy-based method for SubChannel Power Imbalance Ratio (SCPIR) estimation may be used. As seen from FIG. 1, SubChannel Power Imbalance Ratio (SCPIR) can be easily calculated if angle α is known. Angle α can be obtained if a constellation point in any quadrant in the complex plane is known. For example, if a constellation point in the first quadrant is known, angle α can be easily calculated. Following the same idea, if an energy for a real part of and an energy for an imaginary part of the constellation point in the first quadrant are known, angle α α and hence SubChannel Power Imbalance Ratio (SCPIR) can be obtained.

Figure 2:
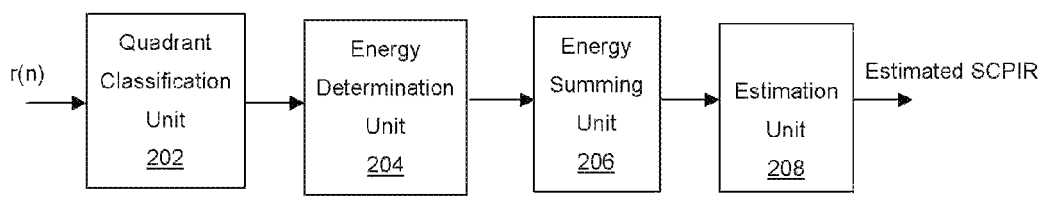
FIG. 2 illustrates a block diagram of an exemplary device for performing an energy-based method.

FIG. 2 illustrates a block diagram of an exemplary device 200 for performing an energy-based method such as an exemplary energy-based method 300 shown in FIG. 3. The device 200 comprises a quadrant classification unit 202, an energy determination unit 204, an energy summing unit 206, and an estimation unit 208.

The method 300 is used for estimating a SubChannel Power Imbalance Ratio (SCPIR) of an input shared channel signal such as a Voice services over Adaptive Multiuser channels on One Slot (VAMOS) signal.

A process shown in FIG. 3 begins when the quadrant classification unit 202 classifies a plurality symbols r(n) in the input shared channel signal into a plurality of quadrants (for example, four quadrants) in a complex plane (step 302 in FIG. 3). Rules for the classification may be as follows:

$$r_1(m) = r(n) \text{ if } \text{real}(r(n)) \geq 0 \text{ and } \text{imag}(r(n)) \geq 0, m=0, \ldots, N_1-1 \quad (8)$$

$$r_2(m) = r(n) \text{ if } \text{real}(r(n)) < 0 \text{ and } \text{imag}(r(n)) \geq 0, m=0, \ldots, N_2-1 \quad (9)$$

$$r_3(m) = r(n) \text{ if } \text{real}(r(n)) < 0 \text{ and } \text{imag}(r(n)) < 0, m=0, \ldots, N_3-1 \quad (10)$$

$$r_4(m) = r(n) \text{ if } \text{real}(r(n)) > 0 \text{ and } \text{imag}(r(n)) < 0, m=0, \ldots, N_4-1 \quad (11)$$

$$N_1 + N_2 + N_3 + N_4 = N_B \quad (12)$$

where $r_1(m)$, $r_2(m)$, $r_3(m)$, and $r_4(m)$ represent symbols classified into a first quadrant, a second quadrant, a third quadrant, and a fourth quadrant respectively, real(r(n)) and imag(r(n)) represent a real part and an imaginary part of r(n) respectively, $N_1$, $N_2$, $N_3$, and $N_4$ represent the number of symbols classified into the first quadrant, the second quadrant, the third quadrant, and the fourth quadrant respectively, and $N_B$ represents the number of symbols in one burst.

Next, the energy determination unit 204 determines a real part energy and an imaginary part energy for the plurality of symbols in each of the plurality of quadrants respectively (step 304 in FIG. 3). For example, all of symbols in each of four quadrants may be processed as follows:

$$E_I^i = [\sum_{m=0}^{N_i-1} \text{real}(r_i(m))]^2 \ i=1,2,3,4 \quad (13)$$

$$E_Q^i = [\sum_{m=0}^{N_i-1} \text{imag}(r_i(m))]^2 \ i=1,2,3,4 \quad (14)$$

where $E_I^i$ and $E_Q^i$ represent a real part energy and an imaginary part energy for all of symbols in the $i^{th}$ quadrant respectively, $r_i(m)$ represents symbols in the $i^{th}$ quadrant, real($r_i(m)$) and imag($r_i(m)$) represent a real part and an imaginary part of $r_i(m)$ respectively, and $N_i$ represents the number of symbols classified into the $i^{th}$ quadrant.

Next, the energy summing unit 206 determines a real part energy sum $E_I$ and an imaginary part energy sum $E_Q$ by summing the real part energy $E_I^i$ and the imaginary part energy $E_Q^i$ for the plurality of quadrants respectively (step 306 in FIG. 3). For example, the real part energy sum $E_I$ and the imaginary part energy sum $E_Q$ may be calculated as follows:

$$E_I = \sum_{i=1}^{4} E_I^i \tag{15}$$

$$E_Q = \sum_{i=1}^{4} E_Q^i \tag{16}$$

The process then completes when the estimation unit 208 estimates the SubChannel Power Imbalance Ratio (SCPIR) of the input shared channel signal based on the real part energy sum $E_I$ and the imaginary part energy sum $E_Q$ (step 308 in FIG. 3). For example, the SubChannel Power Imbalance Ratio ( ) may be estimated as follows:

$$SCPIR = 10\log_{10}\left(\frac{E_I}{E_Q}\right) \tag{17}$$

Figure 4:
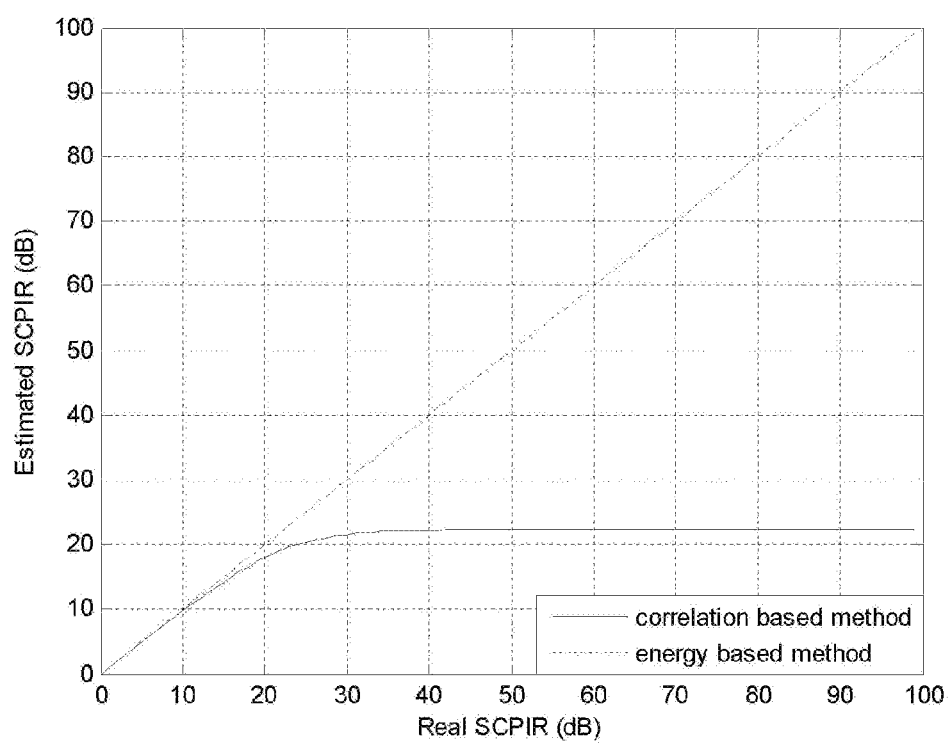
FIG. 4 illustrates exemplary simulation results of Sub-Channel Power Imbalance Ratio (SCPIR) estimation using a correlation-based method and an energy-based method.

FIG. 4 illustrates exemplary simulation results of SubChannel Power Imbalance Ratio (SCPIR) estimation using the correlation-based method and the energy-based method as set forth above. As shown, a horizontal axis indicates the real SubChannel Power Imbalance Ratio (SCPIR) in dB, and a vertical axis indicates the estimated SubChannel Power Imbalance Ratio (SCPIR) in dB. A simulation result of SubChannel Power Imbalance Ratio (SCPIR) estimation using the correlation-based method is denoted by a solid line, and a simulation result of SubChannel Power Imbalance Ratio (SCPIR) estimation using the energy-based method is denoted by a dashed line.

It can be seen from the simulation results shown in FIG. 4 that the energy-based method has no ceiling effect and renders the estimated SubChannel Power Imbalance Ratio (SCPIR) conform to the real SubChannel Power Imbalance Ratio (SCPIR) in full range. The reason for this is that the energy-based method uses an energy ratio between two users to estimate the SubChannel Power Imbalance Ratio (SCPIR). When one user is not transmitting, an energy of the user is zero and can be estimated accurately (here an interference and a white noise are not taken into account). Therefore, a positive infinite or a negative infinite can be obtained when only one user is transmitting.

Further, the correlation-based method uses only a Training Sequence Code (TSC) part in one burst. Since the Training Sequence Code (TSC) part has only 26 symbols, it is not statistically enough. When an input shared channel signal (such as a Voice services over Adaptive Multiuser channels on One Slot (VAMOS) signal) is polluted by noise, the estimated SubChannel Power Imbalance Ratio (SCPIR) may fluctuate a lot. In the energy-based method, all of 148 symbols in one burst are used. Thus, the influence of noise may be mitigated.

Figure 5:
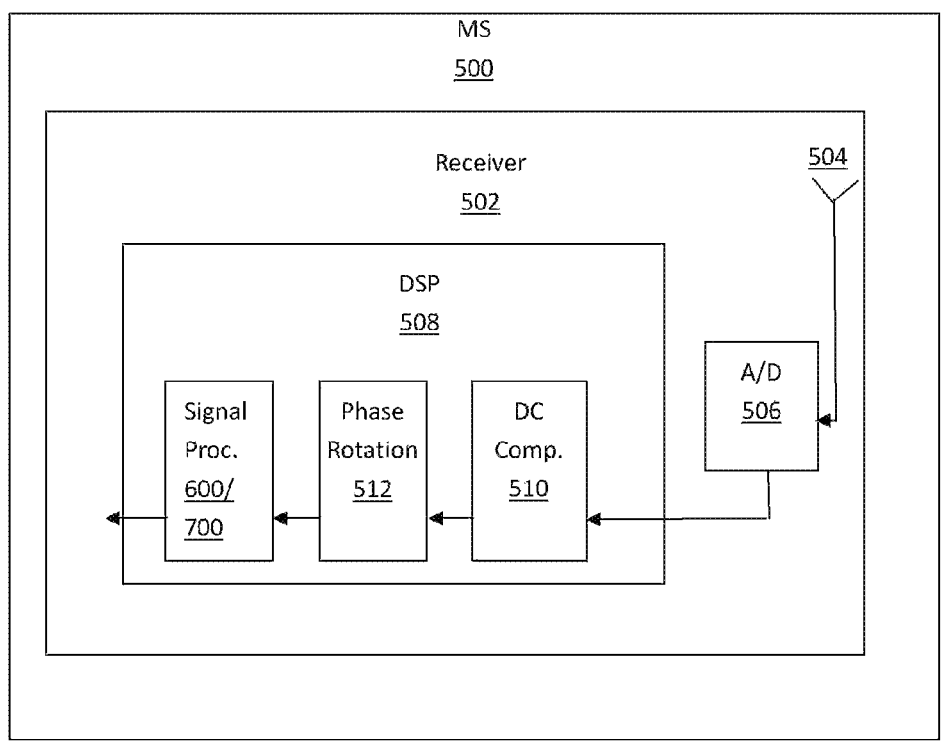
FIG. 5 illustrates a schematic block diagram of an exemplary Mobile Station (MS) in which the energy-based method may be utilized.

FIG. 5 illustrates a schematic block diagram of an exemplary Mobile Station (MS) 500 in which the energy-based method as set forth above may be utilized. The Mobile Station (MS) 500 comprises a receiver 502 which comprises an antenna 504, an Analog-to-Digital converter (A/D) 506 and a Digital Signal Processing (DSP) unit 508. The Digital Signal Processing (DSP) unit 508 comprises a Direct Current (DC) compensation unit 510, a phase rotation unit 512, and a signal processing unit 600 or a signal processing unit 700. The signal processing unit 600 and the signal processing unit 700 are illustrated in detail in FIGS. 6 and 7 respectively.

In general, an input shared channel signal (such as a Voice services over Adaptive Multiuser channels on One Slot (VAMOS) signal) is received by the antenna 504. Then the signal is converted by the Analog-to-Digital converter (A/D) 506 to a digital signal which is fed into the Digital Signal Processing (DSP) unit 508. In the Digital Signal Processing (DSP) unit 508, the digital signal is processed through, for example, the Direct Current (DC) compensation unit 510, the phase rotation unit 512 into a signal $r(n)=I(n)+jQ(n)$. These components as described herein are known to those skilled in the art, and hence not described in detail further. The signal $r(n)=I(n)+jQ(n)$ is fed into the signal processing unit 600 or the signal processing unit 700.

Figure 6:
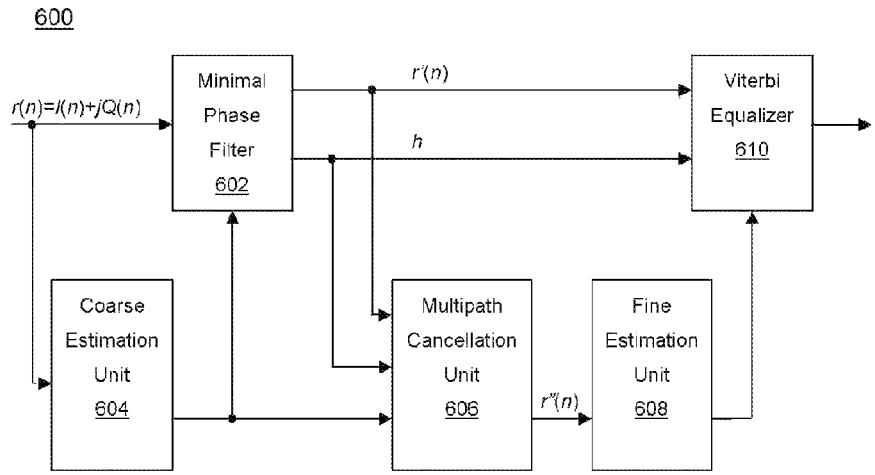
FIG. 6 illustrates a block diagram of a signal processing unit of FIG. 5.

FIG. 6 illustrates a block diagram of the signal processing unit 600 of FIG. 5. The signal processing unit 600 comprises a minimal phase filter 602, a coarse estimation unit 604, a multipath cancellation unit 606, a fine estimation unit 608, and a Viterbi equalizer 610.

The signal $r(n)=I(n)+jQ(n)$ is fed into the minimal phase filter 602 which may be used to convert a channel impulse response to a minimal phase. One property of the minimal phase filter 602 is energy compaction. Through use of the minimal phase filter 602, it is guaranteed that the energy of a first tap is 1 and the energy of any other tap is smaller than 1.

The coarse estimation unit 604 may estimate a SubChannel Power Imbalance Ratio (SCPIR) of the signal r(n) by using the correlation-based method as previously mentioned as a coarse estimation for the SubChannel Power Imbalance Ratio (SCPIR) of the signal r(n).

The minimal phase filter 602 requires the SubChannel Power Imbalance Ratio (SCPIR) of the signal r(n) to improve accuracy of a channel estimation. In the minimal phase filter 602, a complex TSC as indicated in formula (2) is used to estimate the channel impulse response. To construct the complex TSC, the SubChannel Power Imbalance Ratio (SCPIR) is needed.

The multipath cancellation unit 606 may cancel a multipath effect in the signal r(n). For example, a Serial Interference Cancellation (SIC) method may be used for a multipath cancellation. A process for the multipath cancellation may be as follows.

It is assumed that the order of the channel impulse response after the minimal phase filter 602 is 2. So the channel impulse response may be given by the following formula:

$$h=[1,h(1),h(2)] \tag{18}$$

The signal after the minimal phase filter 602 may be expressed as:

$$r'(n)=h*s(n)=s(n)+h(1)s(n-1)+h(2)s(n-2) \tag{19}$$

where * represents a linear convolution operator and s(n) represents the transmitted signal.

Considering a frame structure for a mobile communication system, such as a Global System for Mobile communication (GSM) system, a training sequence corresponding to a Training Sequence Code (TSC) is put in the middle of a burst. Hence, for a first symbol in a right half of the burst, two symbols before it are last two symbols in the training sequence corresponding to the Training Sequence Code (TSC). So the multipath effect for the first symbol can be cancelled and hence the first symbol for both users can be hard decoded. Then the process moves to a second symbol in the right half of the burst since two symbols to its left are known, that is, one is the first symbol, and the other is a last symbol in the training sequence corresponding to the Training Sequence Code (TSC). By performing the process iteratively for all of symbols in the burst, the multipath effect can be cancelled.

After the multipath effect is cancelled, the fine estimation unit 608 (such as the device 200 of FIG. 2) may use the energy-based method as previously described in conjunction with FIGS. 2 and 3 as a fine estimation for the SubChannel Power Imbalance Ratio (SCPIR) of the signal r(n). Then the fine SubChannel Power Imbalance Ratio (SCPIR) estimation is fed into the Viterbi equalizer 610 for a better joint detection.

Figure 7:
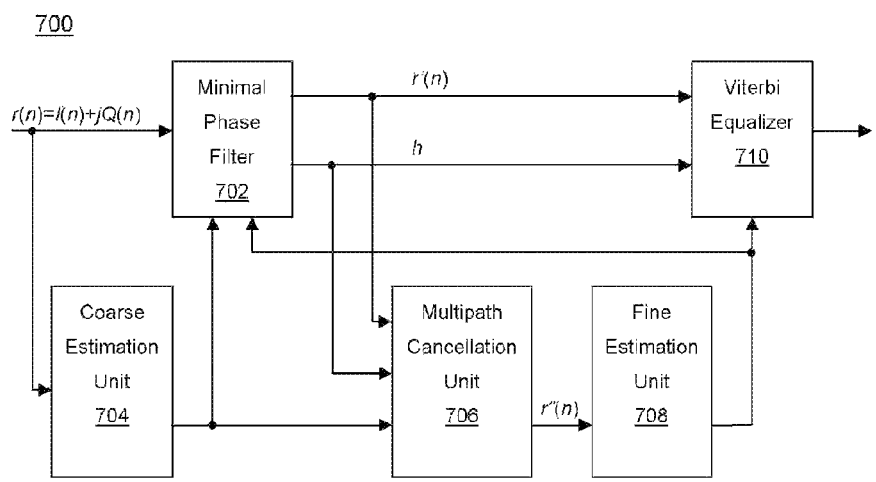
FIG. 7 illustrates a block diagram of another signal processing unit of FIG. 5.

FIG. 7 illustrates a block diagram of the signal processing unit 700 of FIG. 5. The signal processing unit 700 comprises a minimal phase filter 702, a coarse estimation unit 704, a multipath cancellation unit 706, a fine estimation unit 708, and a Viterbi equalizer 710. These components are the same as the similar components in FIG. 6, and hence are not further described in detail.

The difference of the signal processing unit 700 over the signal processing unit 600 is that the fine SubChannel Power Imbalance Ratio (SCPIR) estimation is fed back to the minimal phase filter 702 so as to improve accuracy of the minimal phase filter 702. Initially, the coarse SubChannel Power Imbalance Ratio (SCPIR) estimation is used, and then the fine SubChannel Power Imbalance Ratio (SCPIR) estimation is used. When one user resumes from discontinuous transmission (DTX) or a desired user is paired with a new user, the coarse SubChannel Power Imbalance Ratio (SCPIR) estimation should be used for a certain period of time (for example, tens or hundreds of bursts), and then the fine SubChannel Power Imbalance Ratio (SCPIR) estimation is used. To avoid too much delay and too many buffers, the fine SubChannel Power Imbalance Ratio (SCPIR) estimation should be used in a next burst but not in a current burst. Hence, whenever there is a possibility that a jump of the SubChannel Power Imbalance Ratio (SCPIR) occurs, the coarse SubChannel Power Imbalance Ratio (SCPIR) estimation should be used for a first burst after the jump occurs.

The teachings disclosed herein may also be applied to a non-transitory computer-readable digital storage medium having stored thereon a computer program having a program code for performing, when running on a computing device, a method comprising: classifying a plurality of symbols in an input shared channel signal into a plurality of quadrants in a complex plane; determining a real part energy and an imaginary part energy for the plurality of symbols in each of the plurality of quadrants respectively; determining a real part energy sum $E_I$ and an imaginary part energy sum $E_Q$ by summing the real part energy and the imaginary part energy for the plurality of quadrants respectively; and estimating a SubChannel Power Imbalance Ratio (SCPIR) of the input shared channel signal based on the real part energy sum $E_I$ and the imaginary part energy sum $E_Q$.

Although some aspects have been described in the context of an apparatus, it is clear that these aspects also represent a description of the corresponding method, where a block or device corresponds to a method step or a feature of a method step. Analogously, aspects described in the context of a method step also represent a description of a corresponding block or item or feature of a corresponding apparatus. Some or all of the method steps may be executed by (or using) a hardware apparatus, like for example, a microprocessor, a programmable computer or an electronic circuit. In some examples, some one or more of the most important method steps may be executed by such an apparatus.

Depending on certain implementation requirements, examples of the disclosure can be implemented in hardware or in software or in firmware or in any combination thereof. The implementation can be performed using a digital storage medium, for example a floppy disk, a Digital Versatile Disk (DVD), a Blue-Ray, a Compact Disk (CD), a Read-Only Memory (ROM), a Programmable Read-Only Memory (PROM), an Erasable Programmable Read-Only Memory (EPROM), an Electrically Erasable Programmable Read-Only Memory (EEPROM) or a FLASH memory, having electronically readable control signals stored thereon, which cooperate (or are capable of cooperating) with a programmable computer system such that the respective method is performed. Therefore, the digital storage medium may be computer readable.

In some examples, a programmable logic device (for example a field programmable gate array) may be used to perform some or all of the functionalities of the methods described herein. In some examples, a field programmable gate array may cooperate with a microprocessor in order to perform one of the methods described herein. Generally, the methods are preferably performed by any hardware apparatus.

Throughout the description and claims, the words "comprise", "include", and variations of the words, for example "comprising" and "comprises", means "including but not limited to", and is not intended to (and does not) exclude other components, integers or steps.

Throughout the description and claims, the singular encompasses the plural unless the context otherwise requires. In particular, where the indefinite article is used, the specification is to be understood as contemplating plurality as well as singularity, unless the context requires otherwise.

The above described examples are merely illustrative for the principles of the present invention. It is understood that modifications and variations of the examples and the details described herein will be apparent to others skilled in the art. It is the intent, therefore, to be limited only by the scope of the impending patent claims and not by the specific details presented by way of description and explanation of the examples herein.

What is claimed is:

1. A device comprising:
a quadrant classification unit to classify a plurality of symbols in an input shared channel signal into a plurality of quadrants in a complex plane;
an energy determination unit to determine a real part energy and an imaginary part energy for the plurality of symbols in each of the plurality of quadrants respectively, wherein the plurality of symbols comprises all of the symbols in on burst;
an energy summing unit to determine a real part energy sum $E_I$ and an imaginary part energy sum $E_Q$ by summing the real part energy and the imaginary part energy for the plurality of quadrants respectively;
an estimation unit to estimate a SubChannel Power Imbalance Ratio (SCPIR) of the input shared channel signal based on the real part energy sum $E_I$ and the imaginary part energy sum $E_Q$; and
an equalizer to mitigate interference in the shared channel signal using the SCPIR.

2. The device according to claim 1, wherein the estimation unit estimates the SubChannel Power Imbalance Ratio (SCPIR) of the input shared channel signal by using $$10\log_{10}\left(\frac{E_I}{E_Q}\right).$$

3. The device according to claim 1, wherein the one burst includes 148 symbols.

4. The device according to claim 1, wherein the quadrant classification unit classifies the plurality of symbols of the input shared channel signal into the plurality of quadrants based on values of real parts and imaginary parts of the plurality of symbols.

5. The device according to claim 1, wherein the energy summing unit determines the real part energy and the imaginary part energy by determining an energy of a sum of real parts of and an energy of a sum of imaginary parts of the plurality of symbols in each of the plurality of quadrants respectively.

6. The device according to claim 1, wherein the plurality of quadrants are four quadrants.

7. The device according to claim 1, wherein the input shared channel signal is a Voice services over Adaptive Multiuser channels on One Slot (VAMOS) signal.

8. A mobile station comprising:
a quadrant classification unit to classify a plurality of symbols in an input shared channel signal into a plurality of quadrants in a complex plane;
an energy determination unit to determine a real part energy and an imaginary part energy for the plurality of symbols in each of the plurality of quadrants respectively, wherein the plurality of symbols comprises all of the symbols in one burst;
an energy summing unit to determine a real part energy sum $E_I$ and an imaginary part energy sum $E_Q$ by summing the real part energy and the imaginary part energy for the plurality of quadrants respectively;
an estimation unit to estimate a SubChannel Power Imbalance Ratio (SCPIR) of the input shared channel signal based on the real part energy sum $E_I$ and the imaginary part energy sum $E_Q$; and
an equalizer to mitigate interference in the shared channel signal using the SCPIR.

9. A method comprising:
classifying, by a quadrant classification unit, a plurality of symbols in an input shared channel signal into a plurality of quadrants in a complex plane;
determining, by an energy determination unit, a real part energy and an imaginary part energy for the plurality of symbols in each of the plurality of quadrants respectively, wherein the plurality of symbols comprises all of the symbols in one burst;
determining, by an energy summing unit, a real part energy sum $E_I$ and an imaginary part energy sum $E_Q$ by summing the real part energy and the imaginary part energy for the plurality of quadrants respectively;
estimating, by an estimation unit, a SubChannel Power Imbalance Ratio (SCPIR) of the input shared channel signal based on the real part energy sum $E_I$ and the imaginary part energy sum $E_Q$; and
mitigating, by an equalizer, interference in the shared channel signal using the SCPIR.

10. The method according to claim 9, wherein estimating the SubChannel Power Imbalance Ratio (SCPIR) of the input shared channel signal based on the real part energy sum $E_I$ and the imaginary part energy sum $E_Q$ comprises estimating the SubChannel Power Imbalance Ratio (SCPIR) of the input shared channel signal by using $$10\log_{10}\left(\frac{E_I}{E_Q}\right).$$

11. The method according to claim 9, wherein the one burst includes 148 symbols.

12. The method according to claim 9, wherein classifying the plurality of symbols of the input shared channel signal into the plurality of quadrants comprises classifying the plurality of symbols of the input shared channel signal into the plurality of quadrants based on values of real parts and imaginary parts of the plurality of symbols.

13. The method according to claim 9, wherein determining the real part energy and the imaginary part energy comprises determining an energy of a sum of real parts of and an energy of a sum of imaginary parts of the plurality of symbols in each of the plurality of quadrants respectively.

14. The method according to claim 9, wherein the plurality of quadrants are four quadrants.

15. The method according to claim 9, wherein the input shared channel signal is a Voice services over Adaptive Multiuser channels on One Slot (VAMOS) signal.

16. A non-transitory computer-readable digital storage medium having stored thereon a computer program having a program code for performing, when running on a computing device, a method comprising:
classifying a plurality of symbols in an input shared channel signal into a plurality of quadrants in a complex plane;
determining a real part energy and an imaginary part energy for the plurality of symbols in each of the plurality of quadrants respectively, wherein the plurality of symbols comprises all of the symbols in one burst;
determining a real part energy sum $E_I$ and an imaginary part energy sum $E_Q$ by summing the real part energy and the imaginary part energy for the plurality of quadrants respectively;
estimating a SubChannel Power Imbalance Ratio (SCPIR) of the input shared channel signal based on the real part energy sum Eland the imaginary part energy sum $E_Q$; and
mitigating interference in the shared channel signal using the SCPIR.

* * * * *